US 6,688,188 B2

(12) United States Patent
Chi (10) Patent No.: US 6,688,188 B2
(45) Date of Patent: Feb. 10, 2004

(54) PROGRAMMABLE POWER TRANSMISSION MECHANISM WITH A SMALL-SIZE SERVOMOTOR FOR COOPERATING WITH A POWER SOURCE TO ROTATE A ROTATING SHAFT IN TWO DIRECTIONS

(75) Inventor: Chin-Huai Chi, Chang Hua (TW)

(73) Assignee: Chin Fong Machine Industrial Co., Chang Hua (TW)

( * ) Notice: Subject to any disclaimer, the term of this patent is extended or adjusted under 35 U.S.C. 154(b) by 0 days.

(21) Appl. No.: 10/200,155

(22) Filed: Jul. 23, 2002

(65) Prior Publication Data

US 2003/0119617 A1 Jun. 26, 2003

(51) Int. Cl.[7] .............................. F16H 3/14; F16D 11/06
(52) U.S. Cl. .......................................... 74/355; 192/415
(58) Field of Search ............................ 192/415; 477/2, 477/5; 475/5, 12; 74/404, 355, 331

(56) References Cited

U.S. PATENT DOCUMENTS 3,542,160 A * 11/1970 Sacchini ............... 192/41 S X
5,387,052 A * 2/1995 Artzberger ................. 74/61 X
6,013,002 A * 1/2000 Nonaka ......................... 475/5
6,422,366 B1 * 7/2002 Uehara .................. 192/41 S X

FOREIGN PATENT DOCUMENTS

GB        2170870       * 8/1986

* cited by examiner

Primary Examiner—Roger Pang
(74) Attorney, Agent, or Firm—Baker Botts L.L.P.

(57) ABSTRACT

A programmable power transmission mechanism includes first and second torque output units, each of which has a primary driving gear. When a power source rotates an input gear in one direction, the two primary driving gears rotate in two opposite directions. At this time, a motor shaft of a small-size servomotor can rotate in a first direction so that torque is transmitted from the input gear to a rotating shaft via the first torque output unit. Alternatively, the motor shaft can rotate in a second direction that is opposite to the first direction so that torque is transmitted from the input gear to the rotating shaft via the second torque output unit. As such, the first and second torque output units can drive the rotating shaft to rotate in two opposite directions.

3 Claims, 7 Drawing Sheets

PROGRAMMABLE POWER TRANSMISSION MECHANISM WITH A SMALL-SIZE SERVOMOTOR FOR COOPERATING WITH A POWER SOURCE TO ROTATE A ROTATING SHAFT IN TWO DIRECTIONS

BACKGROUND OF THE INVENTION

1. Field of the Invention

This invention relates to a power transmission mechanism, and more particularly to a programmable power transmission mechanism, which includes a small-size servomotor that cooperates with a power source to rotate a rotating shaft in two directions.

2. Description of the Related Art

Due to the need for automation of mechanical devices, some power sources, such as electrical motors, hydraulic motors, hydraulic cylinders, pneumatic cylinders, etc, are used in a bulky machine that requires a comparatively large power output, e.g. a plastic injection molding machine or a press machine. However, electrical motors or hydraulic motors are capable of unidirectional rotation only. Although a large-size servomotor can offer a large power output to rotate an object in two rotational directions, it is relatively expensive.

SUMMARY OF THE INVENTION

An object of this invention is to provide a power transmission mechanism, which includes a small-size programmable servomotor that cooperates with a power source so as to transmit torque from the power source, thereby rotating a rotating shaft in two directions.

According to this invention, a programmable power transmission mechanism includes first and second torque output units, each of which has a primary driving gear. When a power source rotates an input gear in one direction, the two primary driving gears rotate in two opposite directions. At this time, a motor shaft of a small-size servomotor can rotate in a first direction so that torque is transmitted from the input gear to a rotating shaft via the first torque output unit. Alternatively, the motor shaft can rotate in a second direction that is opposite to the first direction so that torque is transmitted from the input gear to the rotating shaft via the second torque output unit. As such, the first and second torque output units can drive the rotating shaft to rotate in two opposite directions.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
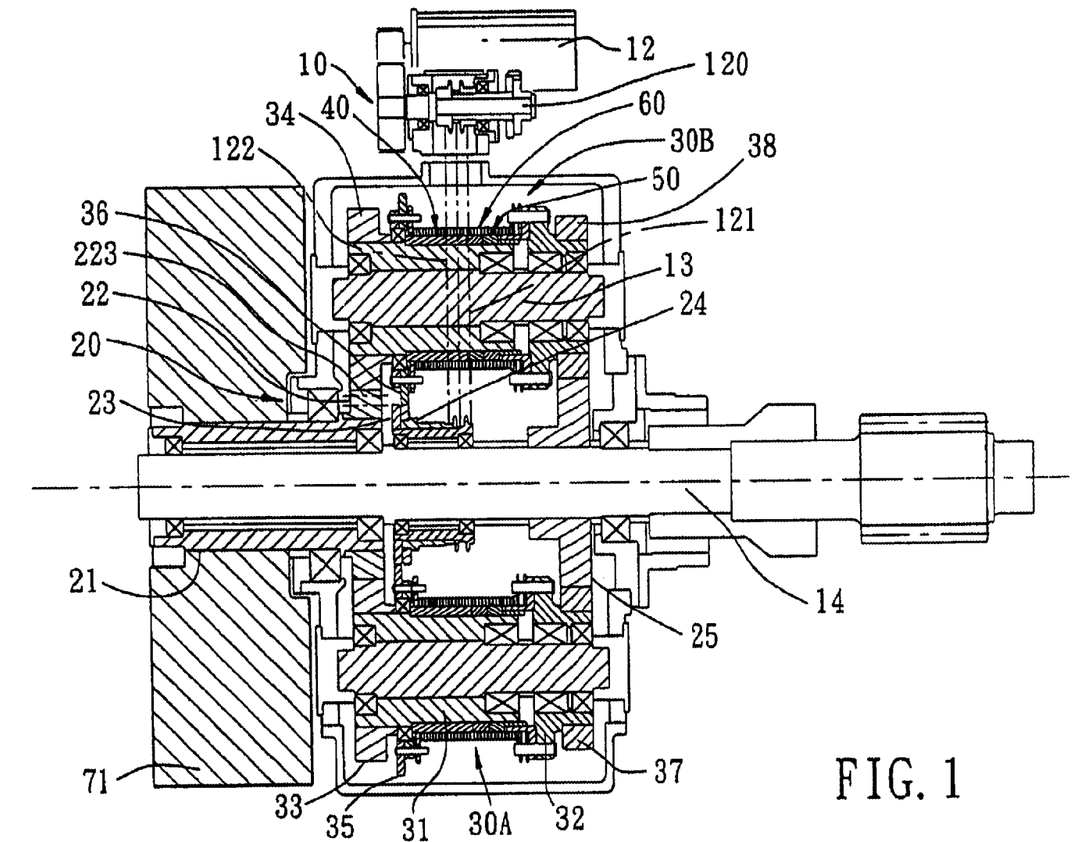
FIG. 1 is a sectional view of the preferred embodiment of a programmable power transmission mechanism according to this invention.
Figure 2:
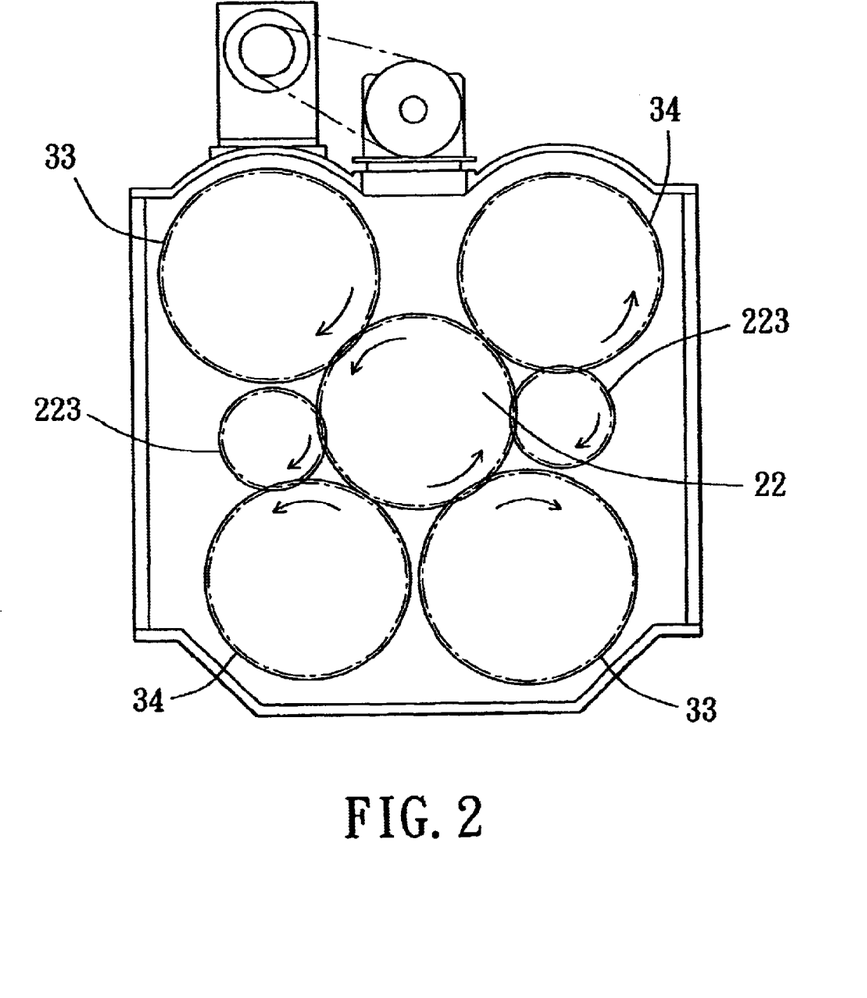
FIG. 2 is a schematic front view of the preferred embodiment, illustrating arrangement of an output gear, four primary driving gears, and two direction-reversing gears.

Referring to FIGS. 1 and 2, the preferred embodiment of a programmable power transmission mechanism according to this invention is shown to include a torque input unit 10, a power transmission unit 20, and an output device.

The torque input unit 10 includes a servomotor 12, four stationary support shafts 13, and a rotating shaft 14 that is parallel to and that is rotatable relative to the support shafts 13. The servomotor 12 is provided with a motor shaft 120 (see FIG. 1), which is rotatable in first or second directions. The first and second directions are opposite to each other.

The torque transmission unit 20 includes a bushing 21, an input gear 22, a first gear 23, a second gear 24, and an output gear 25. The bushing 21 is sleeved rotatably on the rotating shaft 14. The input gear 22 is sleeved fixedly on the bushing 21, e.g. by engagement of an internally splined portion (not shown) and an externally splined portion (not shown), and is adapted to be driven by a power source (not shown) to rotate counterclockwise. The first and second gears 23, 24 are sleeved rotatably on the rotating shaft 14. A first V-belt 121 interconnects the motor shaft 120 and the first gear 23 so as to transfer rotation from the motor shaft 120 to the first gear 23 when the motor shaft 120 rotates in the first direction. A second V-belt 122 interconnects the motor shaft 120 and the second gear 24 so as to transfer rotation from the motor shaft 120 to the second gear 24 when the motor shaft 120 rotates in the second direction. As such, only one of the first and second gears 23, 24 can rotate at a time. The output gear 25 is sleeved fixedly on the rotating shaft 14.

Figure 3:
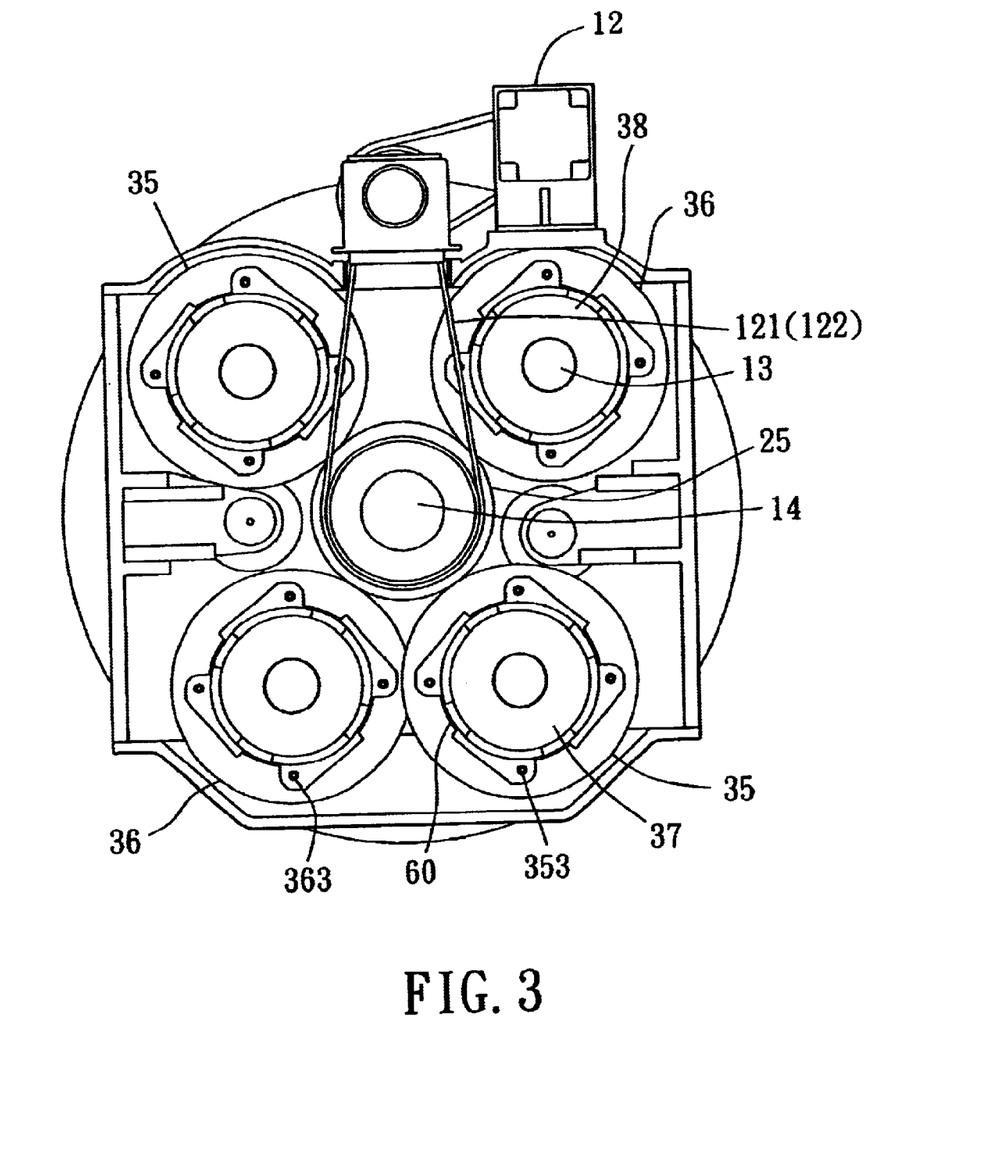
FIG. 3 is a schematic rear view of the preferred embodiment, illustrating arrangement of a rotating shaft, four stationary support shafts, and four driven gears.
Figure 4:
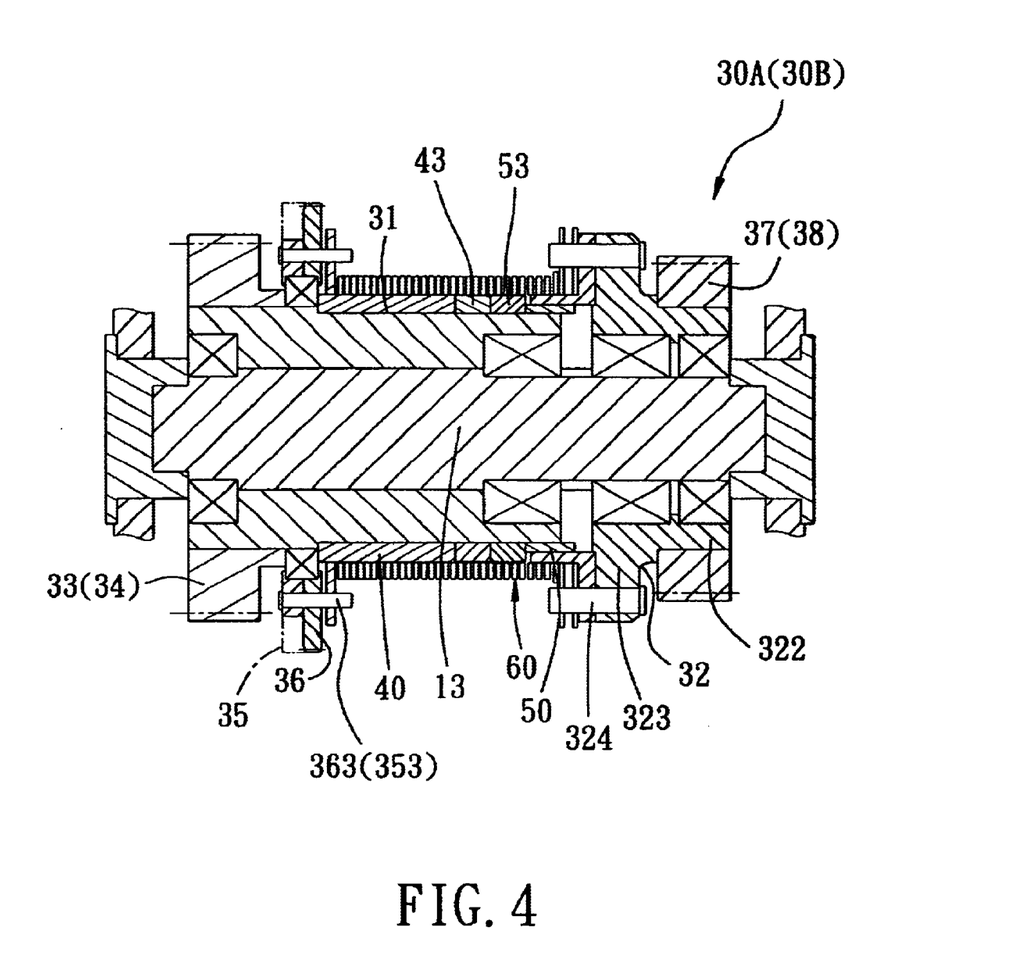
FIG. 4 is a sectional view of a torque output unit of the preferred embodiment.
Figure 5:
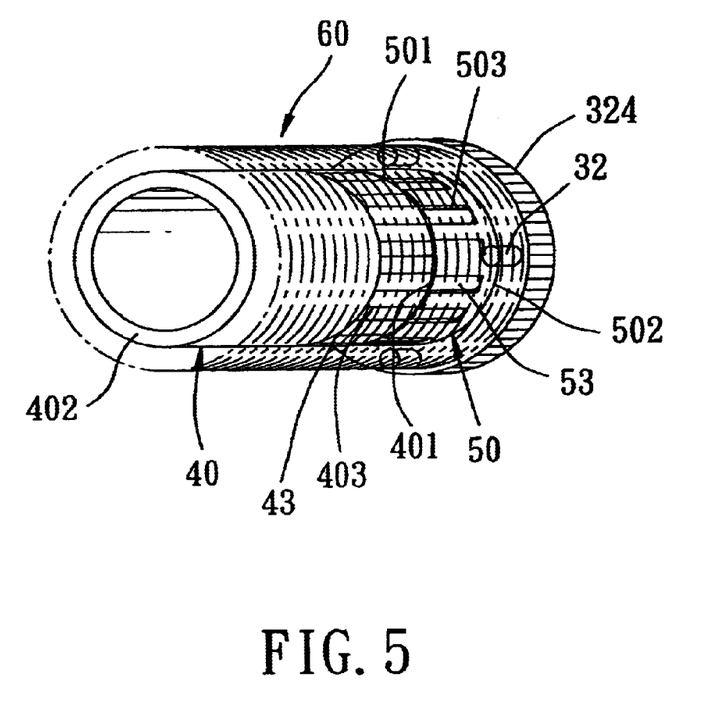
FIG. 5 is a perspective view showing a front outer sleeve, a rear outer sleeve, a plurality of rollers, and a coiled torsional spring of the torque output unit of FIG. 4, which is shown by phantom lines for the sake of clarity.

Referring to FIGS. 2, 3, and 4, the output device includes two first torque output units (30A) (only one is shown in FIG. 1) and two second torque output units (30B) (only one is shown in FIG. 1). Each of the first and second torque output units (30A, 30B) includes a sleeve assembly consisting of an inner sleeve 31, a front outer sleeve 40, a rear outer sleeve 50, and a plurality of rollers 43, 53, a tubular mounting member 32, a primary driving gear 33, 34, a secondary driving gear 35, 36, a driven gear 37, 38, and a coiled torsional spring 60 that has a high rigidity.

The inner sleeves 31 are sleeved respectively and rotatably on the support shafts 13. In each of the sleeve assemblies, the front outer sleeve 40 has a front end 402 and a rear end 401, and the rear outer sleeve 50 has a front end 501 that abuts against the rear end 401 of the front outer sleeve 40, and a rear end 502. Each adjacent pair of the front and rear outer sleeves 40, 50 are sleeved fixedly on a respective one of the inner sleeves 31. Each of the front and rear outer sleeves 40, 50 has an annular surface, which is formed with a plurality of open-ended slots 403, 503 therethrough that are located at the rear end 401 of the front outer sleeve 40 and the front end 501 of the rear outer sleeve 50. Each of the slots 403, 503 extends along an axial direction of the respective support shaft 13. The rollers 43, 53 are confined respectively and rollably within the slots 403, 503.

Each of the rollers 43, 53 has two opposite side portions that project respectively and outwardly from two opposite sides of the respective slot 403, 503.

The primary driving gears 33, 34 are sleeved respectively and fixedly on the inner sleeves 31. The primary driving gears 33 of the first torque output units (30A) mesh with the input gear 22. The primary driving gears 34 of the second torque output units (30B) mesh respectively with two direction-reversing gears 223 that mesh with the input gear 22. Each of the input gear 22, the direction-reversing gears 223, and the primary driving gears 33, 34 is configured as a spur gear. As such, when the input gear 22 rotates counterclockwise, the primary driving gears 33 and the direction-reversing gears 223 rotate clockwise, while the primary driving gears 34 rotate counterclockwise. In this embodiment, the rotational speed of the primary driving gears 33 of the first torque output units (30A) is the same as that of the primary driving gears 34 of the second torque output units (30B) since the primary driving gears 33, 34 have the same tooth number. However, the tooth numbers of the primary driving gears 33, 34, and/or the input gears 22, and/or the direction-reversing gears 223 can be changed so that the rotational speed of the primary driving gears 33 is different from that of the primary driving gears 34.

The secondary driving gears 35, 36 are sleeved respectively and rotatably on the inner sleeves 31, and mesh respectively with the first and second gears 23, 24. As such, when the secondary driving gears 35 rotate, the secondary driving gears 36 are in an idle state, and vice versa.

Each of the mounting members 32 is sleeved rotatably on a rear end portion of the corresponding support shaft 13, and has a thin rear portion 322 and a thick front portion 323 that is formed with a fixed pin 324.

The driven gears 37, 38 are sleeved respectively and fixedly on the thin rear portions 322 of the mounting members 32, and mesh with the output gear 25 so as to transfer rotation from the driven gears 37, 38 to the output gear 25.

Figure 6:
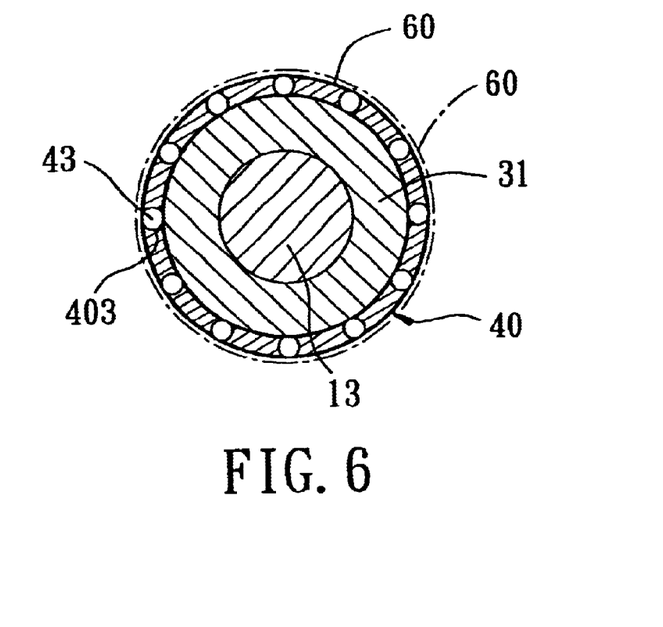
FIG. 6 is a schematic sectional view illustrating how the spring is moved relative to the front outer sleeve between an unwound position and a wound position.
Figure 7:
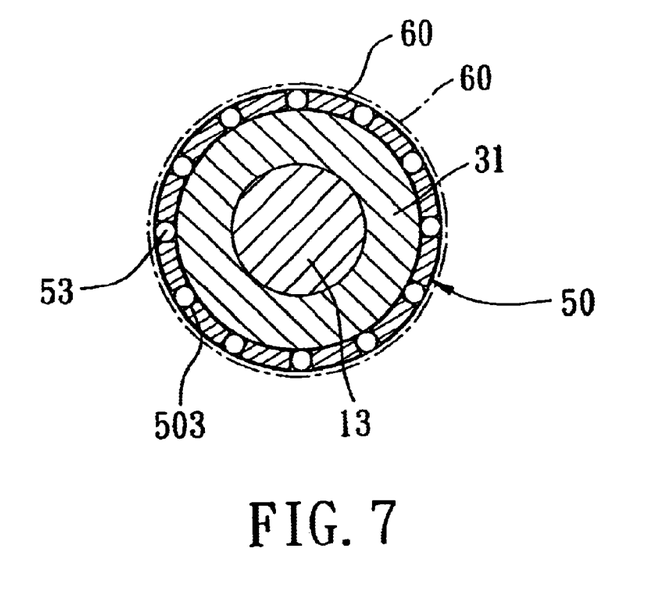
FIG. 7 is a schematic sectional view illustrating how the spring is moved relative to the rear outer sleeve between the unwound position and the wound position.

Each of the coiled torsion springs 60 is located at an unwound position shown by phantom lines in FIGS. 6 and 7, where the spring 60 is disposed around the front and rear outer sleeves 40, 50 and where the spring 60 is spaced apart from the rollers 43, 53 at a small distance, and has a front end that is fastened to a fixed pin 353, 363 on the respective secondary driving gear 35, 36, and a rear end that is fastened to the fixed pin 324 of the respective mounting member 32.

Referring to FIGS. 4, 5, 6, and 7, in each of the first and second torque output units (30A, 30B), when the secondary driving gear 35, 36 rotates, the spring 60 is moved from the unwound position to a wound position shown by solid lines in FIGS. 6 and 7, where the spring 60 is wound around the sleeve assembly such that the spring 60 presses the rollers 43, 53 against the inner sleeve 31 so as to clamp and lock the rollers 43, 53 between the spring 60 and the sleeve assembly. As such, the spring 60 and the rollers 43, 53 are fixed relative to the inner sleeve 31 so as to permit synchronous rotation of the primary driving gear 33, 34, the inner sleeve 31, the front and rear outer sleeves 40, 50, the spring 60, and the driven gear 37, 38 such that power can be transmitted from the inner sleeve 31 to the driven gear 37, 38 when the primary driving gears 33, 34 rotate in the two opposite directions. Accordingly, the spring 60 serves as a clutch device for connection and disconnection of the primary driving gear 33, 34 and the driven gear 37, 38.

During rotation of the primary driving gears 33, 34 in the two opposite directions, when the servomotor 12 rotates the first gear 23 in the first direction (i.e. counterclockwise direction) via the first V-belt 121, the spring 60 of the first torque output unit (30A) moves from the unwound position to the wound position so as to permit synchronous clockwise rotation of the driven gear 37 of the first torque output unit (30A) with the primary driving gear 33, thereby rotating the output gear 25 and the rotating shaft 14 counterclockwise. At this time, the power transmission from the primary driving gear 34 to the rotating shaft 14 is interrupted.

During rotation of the primary driving gears 33, 34 in the two opposite directions, when the servomotor 12 rotates the second gear 24 in the second direction (i.e. clockwise direction) via the second V-belt 122, the spring 60 of the second torque output unit (30B) moves from the unwound position to the wound position so as to permit synchronous counterclockwise rotation of the driven gear 38 with the primary driving gear 34, thereby rotating the output gear 25 and the rotating shaft 14 clockwise. At this time, the power transmission from the primary driving gear 33 to the rotating shaft 14 is interrupted.

Figure 8:
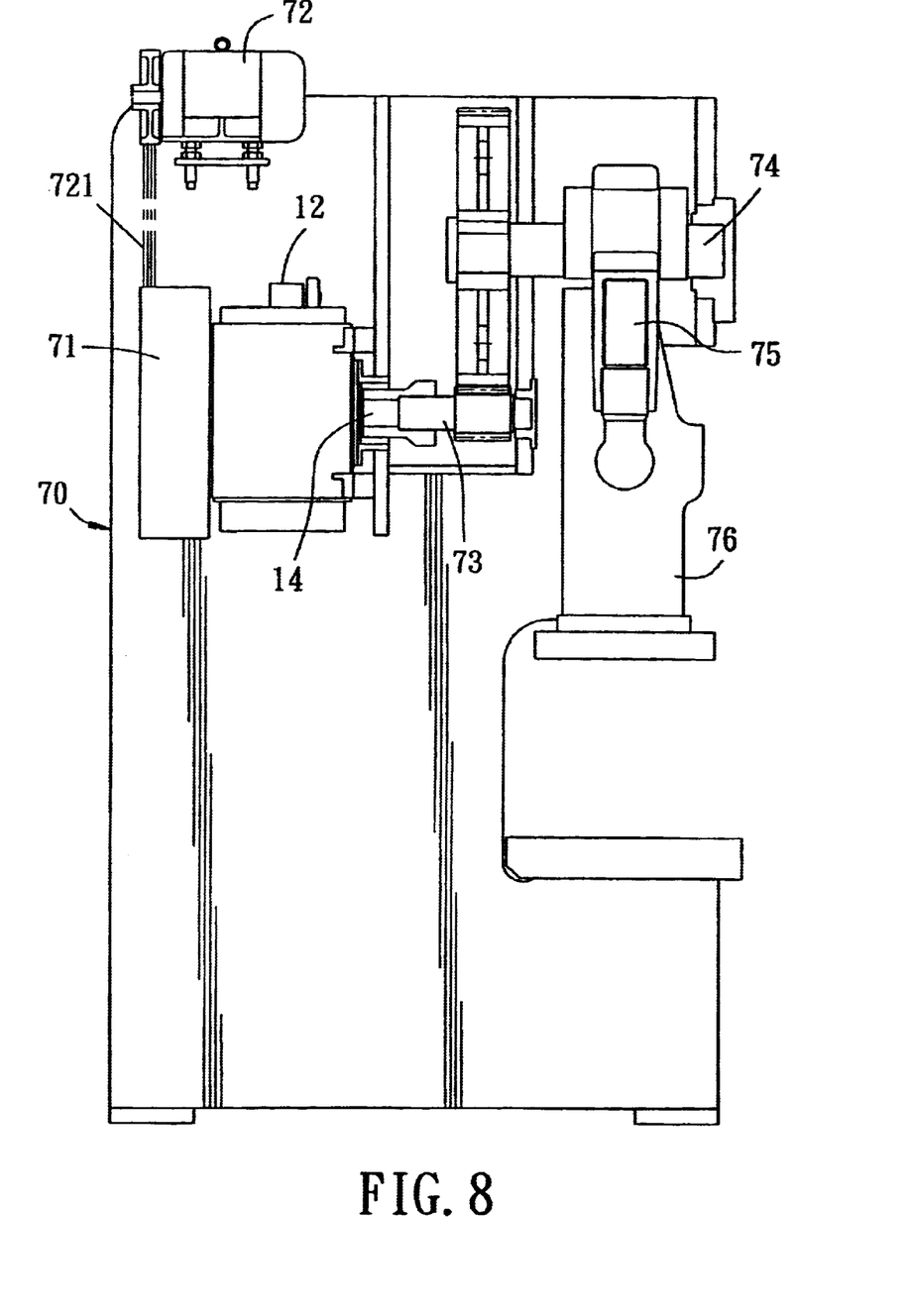
FIG. 8 is a schematic side view illustrating how the preferred embodiment is applied to a press machine.

Referring to FIGS. 1, 3, and 8, the preferred embodiment of the programmable transmission mechanism of this invention can be applied to a press machine 70. An electric motor 72 is installed on the press machine 70, and acts as a power source so as to rotate a flywheel 71 counterclockwise by means of a driving belt 721. Because the flywheel 71 is sleeved fixedly on the bushing 21, the input gear 22 rotates synchronously with the flywheel 71. Hence, the primary driving gears 33 rotate clockwise, while the primary driving gears 34 rotate counterclockwise. When the motor shaft 120 of the servomotor 12 rotates in the first direction during rotation of the primary driving gears 33, 34, the power is transmitted from the primary driving gears 33 to the rotating shaft 14 via the first torque output units (30A), thereby rotating the rotating shaft 14 counterclockwise. Because a driving shaft 73 has an end that is connected fixedly to an end of the rotating shaft 14, it will rotate counterclockwise so as to rotate a crankshaft 74 clockwise via a speed reduction gearing. Thus, a connecting rod 75 that is connected pivotally to the crankshaft 74 is activated so as to move a punch member 76 vertically. Likewise, the servomotor 12 can drive the crankshaft 74 to rotate counterclockwise via the second torque output units (30B) so as to move the punch member 76 vertically.

The servomotor 12 can control connection and disconnection of the primary driving gears 33, 34 and the driven gears 37, 38 such that the crankshaft 74 can rotate reciprocally by an angle of 180 degrees for performing a pressing cycle, which includes a downward pressing movement and an upward withdrawal movement of the punch member 76.

When there is an urgent need to stop immediately a downward pressing movement of the punch member 76, it is only necessary to activate the servomotor 12 so as to unwind the spring 60 from the sleeve assembly, thereby interrupting the power transmission between the electric motor 72 and the rotating shaft 14 while still permitting rotation of the primary driving gears 33, 34.

If the power output of the electric motor 72 is 200 tons, the power transmitted from each of the first and second torque output units (30A, 30B) to the punch member 76 is 50 tons. As such, in a pressing cycle, the two first torque output units (30A) will provide a force of 100 tons to move the punch member 76 downward, and the two second torque output units (30B) will also provide a force of 100 tons to move the punch member 76 upward. It is noted that the number of the first and second torque output units (30A, 30B) could be changed. For example, a modified output device includes three first torque output units (30A) and one second torque output unit (30B) so as to apply a downward pushing force of 150 tons and an upward pulling force of 50 tons to the punch member 76 during a pressing cycle of the punch member 76.

With this invention thus explained, it is apparent that various modifications and variations can be made without departing from the scope and spirit of this invention. It is therefore intended that this invention be limited only as indicated by the appended claims.

I claim:

1. A programmable power transmission mechanism comprising:
    a torque input unit including a servomotor, at least two stationary support shafts, and a rotating shaft that is parallel to and that is rotatable relative to said support shafts, said servomotor being provided with a motor shaft, which is rotatable in opposite first and second directions;
    a torque transmission unit including
        an input gear sleeved rotatably on said rotating shaft and adapted to be driven by a power source to rotate in one of said first and second directions,
        a pair of first and second gears sleeved rotatably on said rotating shaft and rotatable by said servomotor in said first and second directions, respectively, in such a manner that only one of said first and second gears can rotate at a time, and
        an output gear sleeved fixedly on said rotating shaft; and
    an output device including at least one first torque output unit and at least one second torque output unit, each of said first and second torque output units including
        a primary driving gear sleeved rotatably on a respective one of said support shafts, said primary driving gears of said first and second torque output units being connected to said input gear in two different manners so as to rotate in two opposite directions when said input gear rotates,
        a secondary driving gear sleeved rotatably on the respective one of said support shafts and meshing with a respective one of said first and second gears, only one of said secondary driving gears of said first and second torque output units being rotatable at a time,
        a sleeve assembly sleeved rotatably on the respective one of said support shafts and connected fixedly to said primary driving gear;
        a driven gear sleeved rotatably on the respective one of said support shafts and meshing with said output gear so as to transfer rotation between said driven gear and said output gear such that said driven gear and said output gear rotate in two opposite directions, and
        a coiled torsion spring having two ends that are fastened respectively to said secondary driving gear and said driven gear and being movable between a wound position, where said spring is wound on said sleeve assembly so as to permit power transmission from said primary driving gear to said driven gear when said primary driving gear rotates, and an unwound position, where said spring is unwound from said sleeve assembly so as to interrupt the power transmission from said primary driving gear to said driven gear when said primary driving gear rotates.

2. The programmable power transmission mechanism as claimed in claim 1, wherein each of said support shafts has a front portion and a rear portion, said sleeve assembly of each of said first and second torque output units including:
    an inner sleeve disposed rotatably around said support shaft, said primary driving gear being sleeved fixedly on said inner sleeve;
    a pair of front and rear outer sleeves disposed fixedly around said inner sleeve, said front outer sleeve being disposed in front of said rear outer sleeve and having a rear end, said rear outer sleeve having a front end that abuts against said rear end of said front outer sleeve, each of said front outer sleeve and said rear outer sleeve having an annular surface which is formed with a plurality of open-ended slots therethrough that are located at said front end of said rear outer sleeve and said rear end of said front outer sleeve, each of said slots extending in an axial direction of a corresponding one of said support shafts, each of said springs being disposed around said front and rear outer sleeves and having a front end that is fastened to a respective one of said secondary driving gears, and a rear end that is fastened to a respective one of said driven gears; and
    a plurality of rollers disposed respectively and rollably within said slots in said front and rear outer sleeves, each of said rollers having two opposite side portions that project respectively and outwardly from two opposite sides of a respective one of said slots in said front and rear outer sleeves, each of said springs being spaced apart from said rollers of a respective one of said sleeve assemblies when disposed at the unwound position, and pressing said rollers of the respective one of said sleeve assemblies against a respective one of said inner sleeves of said sleeve assemblies when disposed at the wound position such that said rollers of the respective one of said sleeve assemblies are clamped and locked between a respective one of said springs and the respective one of said sleeve assemblies, thereby permitting synchronous rotation of said primary driving gear, said sleeve assembly, said spring, and said driven gear in a respective one of said first and second torque output units when said primary driving gears of said first and second torque output units rotate in the two opposite directions.

3. The programmable power transmission mechanism as claimed in claim 1, wherein each of said input gear and said primary driving gears of said output device is configured as a spur gear, said output device further including a direction-reversing gear that is also configured as a spur gear and that meshes with said input gear, said primary driving gear of said first torque output unit meshing with said input gear, said primary driving gear of said second torque output unit meshing with said direction-reversing gear, whereby said input gear can rotate said primary driving gears of said first and second torque output units in the two opposite directions.

* * * * *